United States Patent

[11] 3,602,832

[72] Inventor William R. Raymond
Pomona, Calif.

[21] Appl. No. 832,801
[22] Filed June 12, 1969
[45] Patented Aug. 31, 1971
[73] Assignee Bell & Howell Company
Chicago, Ill.

[54] LOW ZERO-OFFSET TRANSDUCER APPARATUS
10 Claims, 2 Drawing Figs.

[52] U.S. Cl. .......... 330/86, 330/1 A, 330/69, 330/14
[51] Int. Cl. .......... 15/00
[50] Field of Search .......... 330/61 A, 30 D, 1 A, 86

[56] References Cited

UNITED STATES PATENTS

| | | | |
|---|---|---|---|
| 2,956,234 | 10/1960 | Olsen | 330/10 |
| 3,197,711 | 7/1965 | Richardson | 330/103 |
| 3,246,250 | 4/1966 | Nazereth, Jr. | 330/10 |
| 3,344,283 | 9/1967 | Stubbs | 307/271 X |

*Primary Examiner*—Nathan Kaufman
*Attorney*—David Weiss

ABSTRACT: Three-wire transducer apparatus for producing a low zero-offset output voltage while permitting high full scale operation. In a preferred circuit embodiment, a Zener diode is connected to the transducer's amplifier output terminal, within an included feedback loop. The resistance of a variable resistor referred to a common reference potential is varied in accordance with the magnitude of the transducer output signal, while biasing the Zener diode to maintain breakdown.

William R. Raymond,
INVENTOR.
BY.
David Weiss
ATTORNEY.

LOW ZERO-OFFSET TRANSDUCER APPARATUS

BACKGROUND OF THE INVENTION

1. Field of the Invention

This invention relates to transducers, and more particularly to a three-wire transducer having a low "zero offset" and a high full scale in the transducer output signal.

2. Description of the Prior Art

In a transducer circuit wherein it is desired to utilize only three terminals thereof for excitation and output—generally known as a three-wire transducer—without requirement for DC-to-DC conversation, a single-ended output differential amplifier (such as an operational amplifier) can be used for amplifying the sensor output signal. In order that the signal at the amplifier output terminal respond only to changes in the signal developed by the sensor (in accordance with changes in a condition monitored by the sensor), a negative feedback path can be included between the amplifier output terminal and one of the amplifier's input terminals. In such manner, the effect on the output signal of inherent errors contributed by the amplifier are markedly reduced.

For such transducer systems, however, it is often experienced that when the monitored condition is at a reference level, the system cannot be adjusted such that the signal at the amplifier output reaches zero value referred to a common reference potential. The transducer output voltage at the monitored reference level is termed a "zero-offset" voltage, and its existence is generally attributable to the tendency of the active components in the amplifier to either saturate or cut off in the vicinity of zero difference amplifier input signal. Prior attempts to markedly decrease the zero-offset voltage have produced nonlinearities in the output signal, degrading the accuracy of the system, while decreasing the full scale output of the transducer system.

SUMMARY OF THE INVENTION

The present invention provides means for decreasing the zero-offset voltage, without degrading system accuracy, by coupling circuit means to the amplifier output terminal and within the feedback path. The circuit means produces a predetermined voltage drop in the amplifier output signal, providing a system transducer output signal with a very low zero offset. The predetermined voltage drop is maintained constant with varying amplifier output, without restricting the maximum output voltage swing of the amplifier.

In a preferred embodiment of the circuit means according to the present invention, a Zener diode is connected into the amplifier feedback path, and a variable resistor is connected between the anode of the Zener diode and the common reference potential. Control means responsive to the voltage at the Zener anode (which is the output voltage of the system) is provided for controlling the resistance of the variable resistor such that the Zener diode is always in a biased condition above its breakdown level.

At low values of the amplifier output voltage, the variable resistor is controlled to provide a small resistance for maintaining the Zener diode above breakdown, and for attenuating the feedback voltage. As the amplifier output voltage is increased to full scale, the variable resistor is controlled to correspondingly increase to a predetermined value at full scale; this predetermined value is selected for maintaining Zener breakdown while restricting the generation of excessive currents for full scale operation.

BRIEF DESCRIPTION OF THE DRAWINGS

The novel features which are believed to be characteristic of the invention, together with further advantages thereof, will be better understood from the following description considered in connection with the accompanying drawings in which the invention and a preferred embodiment thereof are illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
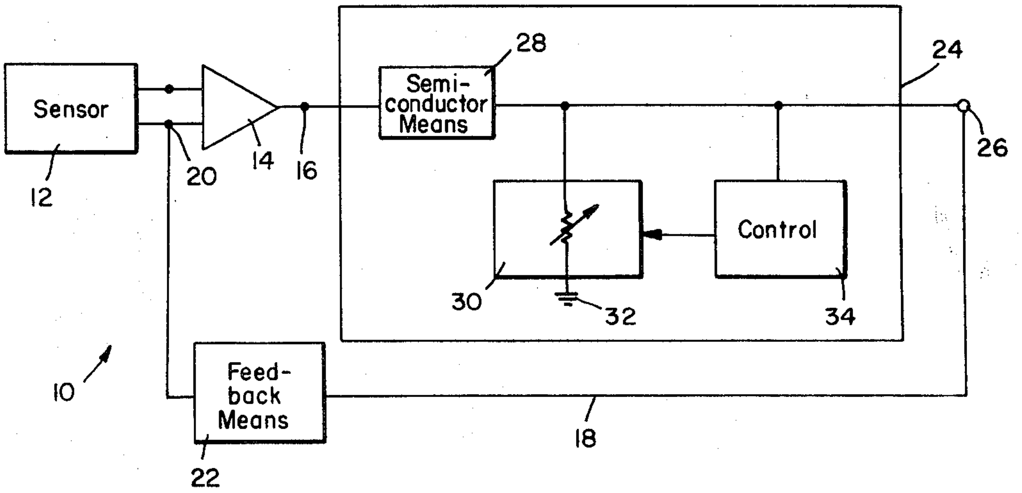
FIG. 1 is a block diagram of a transducer circuit in accordance with the present invention.

Turning first to FIG. 1, a transducer 10 is shown including a sensor means 12 for generating low-level information signals which vary in accordance with variations in a monitored condition. The sensor output signals are amplified by a differential input amplifier 14, such as an operational amplifier, having a single-ended output terminal 16.

The transducer 10 is provided with a negative feedback path 18 between the amplifier output terminal 16 and an input terminal 20 of the amplifier, the feedback path 18 including feedback means 22, for assuring that the amplified output signal at the output terminal 16 is not significantly affected by errors introduced into the system by the amplifier 14.

Circuit means 24, for providing a low zero offset the t transducer output signal appearing at a transducer output terminal 26, is connected between the amplifier output terminal 16 and the transducer output terminal 26, within the feedback path 18. The circuit means 24 establishes a potential different between the terminals 16, 26 and maintains the potential difference to be substantially constant during the entire range of amplifier operation. The magnitude of the potential difference is preselected and the system can be adjusted such that the voltage at the transducer output terminal 26 is substantially at the common reference potential when the condition being monitored by the sensor 12 is at a reference level.

The circuit means 24 includes semiconductor means 28 connected between the amplifier output terminal 16 and the transducer output terminal 26. Variable resistor means 30 is connected between the transducer output terminal 26 and a source of the common reference potential (indicated by the conventional ground symbol 32), for biasing the semiconductor means 28 such that the preselected potential difference is maintained between the terminals 16, 26.

Control means 34 is responsive to the voltage at the transducer output terminal 26, and causes the resistance of the variable resistor means 30 to vary in direct relation to the transducer output voltage. In this manner, a low zero offset is provided at the transducer output terminal 26, while a high amplifier load impedance is provided with increased amplifier output voltage so that the maximum output capability of the amplifier 14 is not impaired.

The present invention finds particular application to sensors having voltage divider and/or bridge-type sensor elements. For example, such sensing elements are shown in combination with single-ended output amplifier configurations in U.S. Pat. No. 3,148,339, issued to Bell et al., which patent is incorporated herein by reference.

Figure 2:
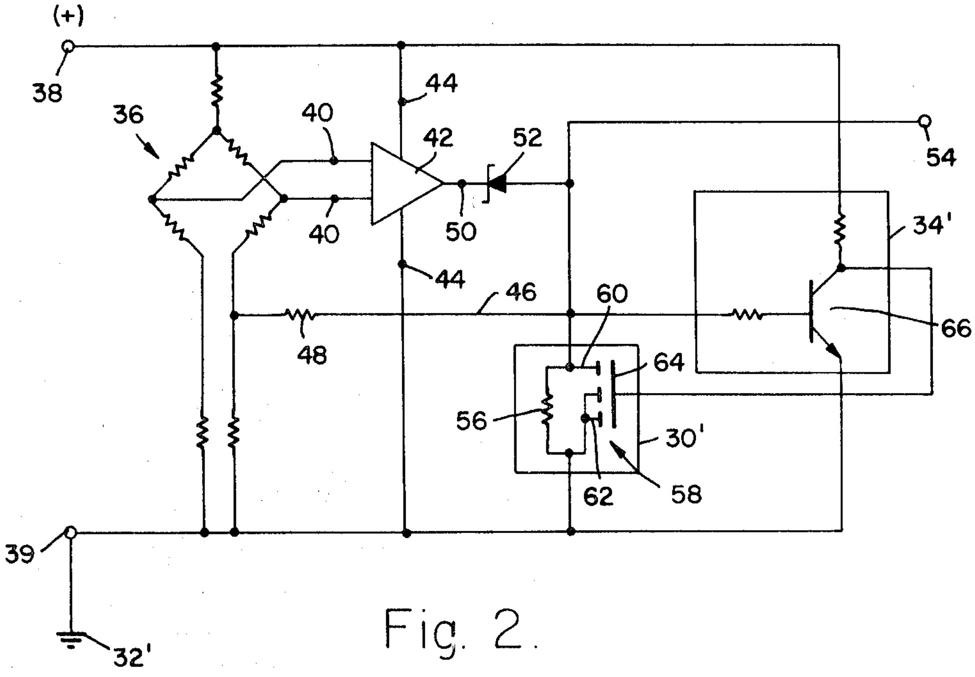
FIG. 2 is a circuit diagram of a preferred embodiment of the transducer according to the present invention.

Turning to the transducer circuit of FIG. 2, a bridge-type sensor 36 is utilized to exemplify the preferred embodiment of the present invention. In this example, a first input terminal 38 of the bridge-type sensor 36 is connected to a power supply of positive potential (not shown), while a second input terminal 39 is connected to the "negative" side of the supply establishing the source of common reference potential 32'. The output sides of the sensor 36 are respectively connected to signal input terminals 40 of an operational amplifier 42; the amplifier main power terminals 44 are respectively connected to the positive supply and to common. A feedback path 46, including a feedback resistor 48 and a portion of the bridge-type sensor 36, is coupled between the single-ended output terminal 50 of the amplifier 42 and one of the amplifier input terminals 42, as shown in the referenced patent.

An avalanche or Zener diode 52 is connected in the feedback path 46, between the amplifier output terminal 50 and a transducer output terminal 54. Variable resistor means 30' is connected between the anode of the Zener diode 52 and the source of the common reference potential 32, which "supplies" biasing current to the Zener diode 52 for maintaining the operation of the Zener diode above its breakdown level.

The variable resistor means 30' includes a fixed resistor 56 in parallel with a controlled variable resistor element, such as a field effect transistor (FET) acting as a linear voltage variable resistor. In a preferred configuration, an N-channel enhancement mode MOS FET 58 is utilized with its drain 60 connected to the anode of the Zener diode 52 and its Source 62 connected to the source of common reference potential 32'.

The Gate 64 of the MOS FET 58 is driven by the control means 34', in accordance with the voltage at the anode of the Zener diode 52, the control means 34' including a transistor 66 connected into the circuit in a common emitter configuration.

During transducer calibration, the system is adjusted for producing approximately a zero-output signal at the transducer output terminal 54 when the monitored condition is at a reference level. This is accomplished through suitable adjustment of either the bridge-type sensor 36 or the amplifier 42, or combined adjustment to both sensor and amplifier. The voltage drop between the output terminals 50, 54 is therefore referenced to produce a low zero offset in the output signal at the transducer output terminal 54.

During transducer operation, and when a relatively low output voltage is present at the transducer output terminal 54, the base voltage of the transistor 66 is also low, causing the transistor 66 to be relatively nonconducting. The high voltage at the collector of the transistor 66 (approximately equal to the positive supply voltage) is transmitted to the gate 64 of the MOS FET 58, causing the impedance between its drain 60 and source 62 to be very low. The voltage at the transducer output terminal 54 can therefor approach the common reference potential to provide a low zero offset.

As the voltage at the transducer output terminal 54 is increased, the voltage at the base of the transistor 66 is correspondingly increased, increasing the conductivity of the transistor 66. As the collector voltage is accordingly decreased, the FET Gate 64 becomes less positive, increasing the impedance between the drain 60 and source 62. At amplifier full scale, the resistance of the variable resistor means 30' is determined by the value of the fixed resistor 56.

The variable resistor means 30' is therefore caused to change from a low to a high value in a continuous manner, and therefore does not introduce nonlinearities which cannot be compensated by the feedback loop 46.

The value of the fixed resistor 56 must be sufficiently low to maintain breakdown operation of the Zener diode 52 (for high amplifier output voltages), while being high enough to prevent the generation of excessive currents through the fixed resistor 56 and to prevent a decrease in the output voltage swing of the amplifier 42.

Instead of a Zener diode 52, a forward-biased junction diode can be alternatively utilized. For example, a signal or rectifier diode having an anode connected to the amplifier output terminal 50 and a cathode connected to the transducer output terminal 52 can be employed, the variable resistor means 30' being controlled for maintaining the diode in a forward-biased condition. The Zener diode 52 is preferred, however, because of the constancy of the potential difference produced thereacross as represented by in Zener voltage.

In one example of the circuit of FIG. 2, a zero offset of 10 mv. DC and a full scale of 10 v. DC were achieved with a 15-v. DC excitation source.

Thus, there has been described a preferred embodiment of a single-ended transducer circuit for producing a low zero-offset voltage while achieving high full scale operation. Other embodiments of the present invention and modifications of the embodiment herein presented may be developed without departing from the essential characteristics thereof.

Accordingly, the present invention should only be limited by the scope of the claims listed below.

1. Transducer apparatus comprising:

a first input terminal for connection to a source of voltage excitation;

a second input terminal for connection to a source of a common reference potential;

DC amplifier means having signal input terminals and a single-ended output terminal, and power supply terminals respectively connected to said first and second input terminals;

a bridge-type sensor having power supply terminals respectively connected to said first and second input terminals, and sensor output terminals respectively connected to said signal input terminals;

a transducer output terminal;

semiconductor means connected between said single-ended output terminal and said transducer output terminal, operable for providing a substantially unvarying potential difference between said output terminals such that the potential at said transducer output terminal approaches the common reference potential when the monitored condition is at a reference level;

negative feedback means coupled between said transducer output terminal and one of said signal input terminals through a portion of said bridge-type sensor;

variable resistor means connected between said transducer output terminal and said second input terminal, having a resistance range for maintaining operability of said semiconductor means, said range including a lower value for permitting the potential at said transducer output terminal to approach the common reference potential and an upper value for preventing excessive generation of current through said resistor means; and control means responsive to the potential at said transducer output terminal when said first and second input terminals are respectively connected to said sources, for controlling the resistance of said variable resistor means to vary in direct relation to the potential at said transducer output terminal.

2. A transducer comprising:

a voltage excitation source;

a source of a common reference potential;

DC amplifier means having signal input terminals and a single-ended output terminal, and power supply terminals respectively connected to said sources;

a bridge-type sensor having input terminals respectively connected to said sources, and sensor output terminals connected to said amplifier signal input terminals;

a transducer output terminal;

semiconductor means connected between said amplifier output terminal and said transducer output terminal, operable for providing a substantially unvarying potential difference between said output terminals such that the potential at said transducer output terminal approaches the common reference potential when the monitored condition is at a reference level;

negative feedback means coupled between said transducer output terminal and one of said amplifier signal input terminals through a portion of said bridge-type sensor;

variable resistor means connected between said transducer output terminal and said source of common reference potential, having a resistance range for maintaining operability of said semiconductor means, said range including a lower value for permitting the potential at said transducer output terminal to approach the common reference potential and an upper value for preventing excessive generation of current through said resistor means; and control means responsive to the potential at said transducer output terminal for controlling the resistance of said variable resistor means to vary in direct relation to the potential at said transducer output terminal.

3. Transducer apparatus comprising:

sensor means, for generating a sensor signal and for producing variations in said signal in response to changes in a monitored condition;

DC amplifier means having two input terminals coupled to said sensor means for receiving said sensor signal, and a single-ended output terminal;

a transducer output terminal;

semiconductor means connected between said amplifier output terminal and said transducer output terminal, operable for providing a substantially unvarying potential difference between said output terminals such that the potential at said transducer output terminal approaches a common reference potential when the monitored condition is at a reference level;

variable resistor means connected between said transducer output terminal and the common reference potential, having a resistance range for maintaining operability of said semiconductor means, said range including a lower value for permitting the potential at said transducer output terminal to approach the common reference potential and an upper value for preventing excessive generation of current through said resistor means; and control means responsive to the potential at said transducer output terminal, for controlling the resistance of said variable resistor means to vary through said range in direct relation to the potential at said transducer output terminal.

4. The apparatus according to claim 3 further including:

negative feedback means coupled between said transducer output terminal and one of said amplifier input terminals.

5. The apparatus according to claim 3, wherein said semiconductor means is a Zener diode.

6. The transducer apparatus according to claim 4 wherein said semiconductor means includes a Zener diode having a cathode connected to said amplifier output terminal and an anode connected to said transducer output terminal.

7. The transducer apparatus according to claim 4 wherein said semiconductor means includes a signal diode having an anode connected to said amplifier output terminal and a cathode connected to said transducer output terminal.

8. The transducer apparatus according to claim 4 wherein said variable resistor means includes a fixed resistor and a variable resistor in parallel connection, the resistance of said variable resistor controlled by said control means to vary in direct relation to the potential at said transducer output terminal.

9. The transducer apparatus according to claim 2, wherein said variable resistor is a field effect transistor.

10. A transducer comprising:

sensor means for generating a sensor signal varying in response to variations in a monitored condition;

single-ended output DC amplifier means coupled to said sensor means for amplifying said sensor signal to produce an amplified signal varying proportionally to the variations in said sensor signal; and semiconductor means operatively coupled to said amplifier for modifying said amplified signal by providing a substantially unvarying voltage drop in said amplified signal such that the voltage of the modified signal approaches a common reference potential when the monitored condition is at a reference level;

variable resistor means connected between said semiconductor means and the common reference potential, having a resistance range for maintaining operability of said semiconductor means, said range including a lower value for permitting the modified signal to approach the common reference potential and an upper value for preventing excessive generation of current through said resistor means; and control means responsive to the modified signal, for controlling the resistance of said variable resistor means to vary through said range in direct relation to the modified signal voltage.